United States Patent [19]
Jubert

[11] Patent Number: 6,068,186
[45] Date of Patent: May 30, 2000

[54] CHIP CARD READER WITH ADAPTER FOR READING CARDS OF DIFFERENT FORMATS, TELEPHONE COMPRISING SUCH A READER

[75] Inventor: Laurent Jubert, Change, France

[73] Assignee: U.S. Philips Corporation, New York, N.Y.

[21] Appl. No.: 09/135,192

[22] Filed: Aug. 17, 1998

[30] Foreign Application Priority Data

Aug. 19, 1997 [FR] France ................................ 97 10472

[51] Int. Cl.⁷ ...................................................... G06K 7/06
[52] U.S. Cl. ........................................... 235/441; 235/486
[58] Field of Search ..................................... 235/441, 486

[56] References Cited

U.S. PATENT DOCUMENTS 5,796,085  8/1998  Blaiar ..................................... 235/441

FOREIGN PATENT DOCUMENTS

0556970A1  8/1993  European Pat. Off. .

*Primary Examiner*—Harold I. Pitts
*Attorney, Agent, or Firm*—Dicran Halajian

[57] ABSTRACT

An invention is disclosed, which makes it possible to read a large or a small card which have the same contact configuration. A sliding plate is provided for this purpose: it slides between an open and a closed position. When the plate is in the open position, a small card may be inserted into the chamber. In closed position, the plate makes it possible to keep this small card and ensure a sufficient pressure for establishing the electrical contact. The plate has an opening intended to let the connector come through when there is no small card: it may thus be used as a support to a large card.

7 Claims, 2 Drawing Sheets

CHIP CARD READER WITH ADAPTER FOR READING CARDS OF DIFFERENT FORMATS, TELEPHONE COMPRISING SUCH A READER

FIELD OF THE INVENTION

The invention relates to an electronic card reader comprising a connector and adapter means for reading a large or a small card having the same contact configuration.

The invention likewise relates to a telephone incorporating such a card reader for reading a large card called ISO SIM card or a small card called Micro SIM card.

The invention has interesting applications in the field of mobile telephony and notably in accordance with the GSM standard which provides the use of two different formats for the SIM card, the Subscriber Identity Module card.

BACKGROUND OF THE INVENTION

European Patent application no. 0 556 970 A1 describes a radio telephone which is suitable for receiving either of the SIM card formats. This radio telephone comprises an adapter which, for reading a large card, is placed in a cavity in order not to form an obstacle to the passage of the card and which, for reading a small card, switches by means of a pin/plate connection the contacts of the integrated circuit of the card to the connector of the card reader.

This solution has the following drawback: during the switching of the adapter, the latter protrudes from the body of the telephone and thus becomes vulnerable to impacts. A transversal impact actually ventures to break down the pivot link thus irredeemably separating the adapter from the body of the telephone.

In addition, this solution is relatively cumbersome which runs counter to the current tendency of miniaturization of mobile telephones.

SUMMARY OF THE INVENTION

Notably, it is an object of the invention to remedy these drawbacks. For this purpose, a card reader according to the invention and as described in the opening paragraph is characterized in that said adapter means comprise a plate intended to be moved between an open position notably for inserting a small card into a chamber provided around said connector and a closed position notably for keeping the previously inserted card in place, said plate having an opening provided around said connector which permits to establish a contact between said connector and a large card previously placed on the plate.

In particularly advantageous embodiments of the invention, the plate has means for exerting a contact pressure on a small card inserted into said chamber, and the reader comprises pull-back means when the plate is in closed position.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENT

Figure 1:
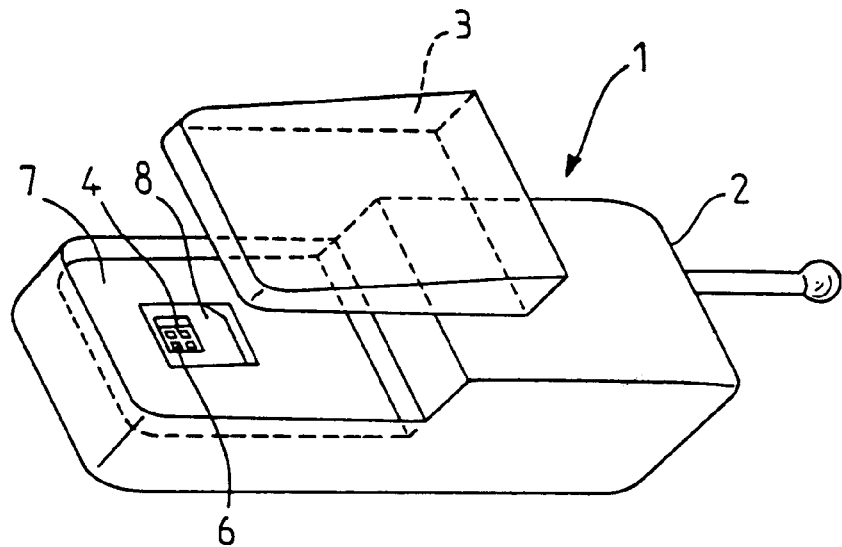
FIG. 1 represents a telephone according to the invention.

In FIG. 1 is shown in a diagram a telephone 1 according to the invention. This telephone 1 comprises a main housing 2 and a removable module 3 which serves as a cover for the telephone and which contains, for example, a battery for supplying electric power to the telephone.

Figure 2:
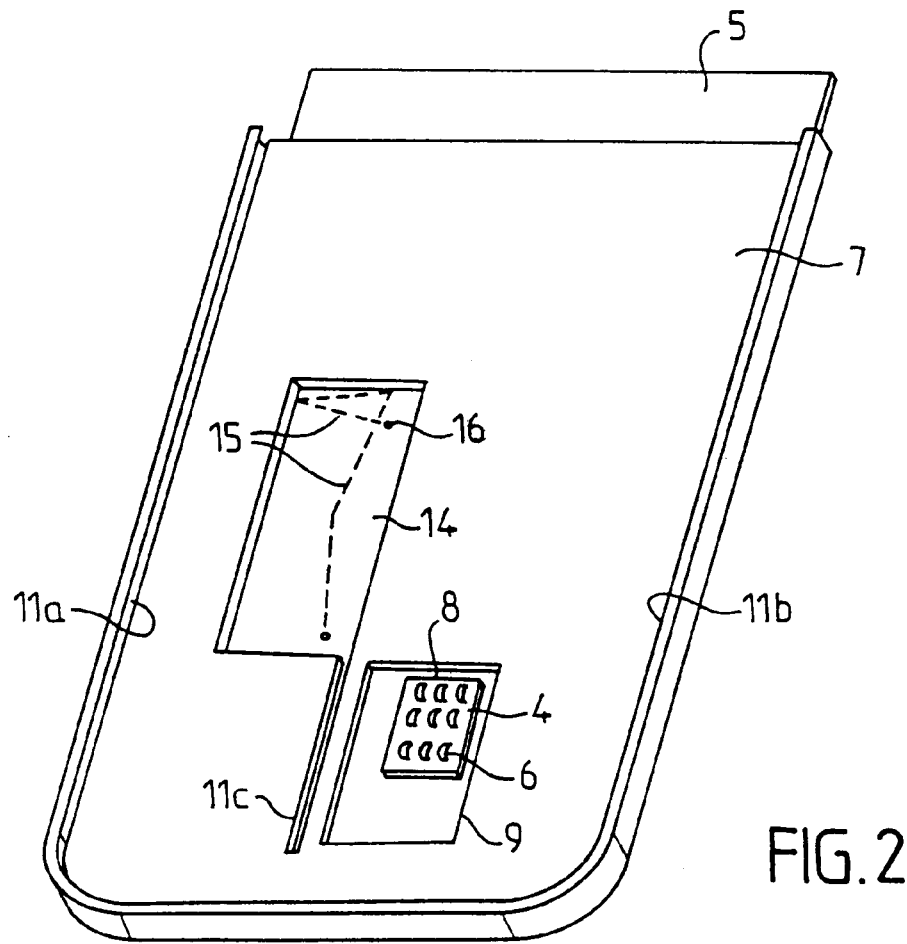
FIG. 2 is a diagrammatic representation of a back-view of a main housing of a telephone according to the invention, without a plate.

As represented in FIGS. 1 and 2, the main housing 2 contains a printed circuit card 5 to which are fixed among other components a connector 4 of a chip card reader. The main housing 2 is the frame of the chip card reader. The connector 4 has resilient contact pins 6 intended to be brought into contact with the terminals of the integrated circuit of a chip card. A support 7 of plastic material is placed over the printed circuit card. It has an opening 8 for leaving the pins of the connector 4 to pass through and a chamber 9 provided around this opening 8 and intended to receive a small-format chip card, or Micro SIM card.

A sliding plate 10 (FIGS. 3 and 4) placed over the support 7 is intended to slide in guides 11a and 11b provided on the sides of the main housing 2 and also in a guide 11c called central guide which is provided in the support 7 along the opening 8. The sliding plate has slides 12a and 12b engaging with the central guide 11c: these slides 12a and 12b are L-shaped slides cut out from the sliding plate and folded perpendicular to the plate. The use of such a central slide makes it possible to exert sufficient pressure on a small card inserted into the chamber 9 to ensure the electrical contact with the pins of the connector 4.

Figure 4:
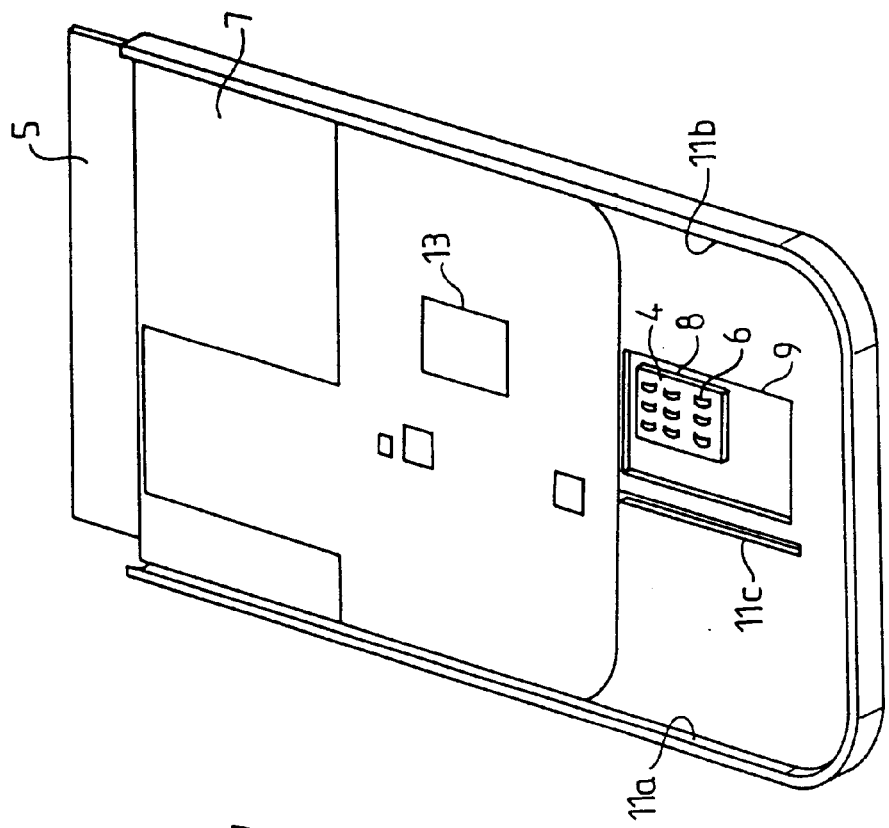
FIG. 4 is a diagrammatic representation of a back-view of a main housing of a telephone according to the invention, with a plate in open position.
Figure 3:
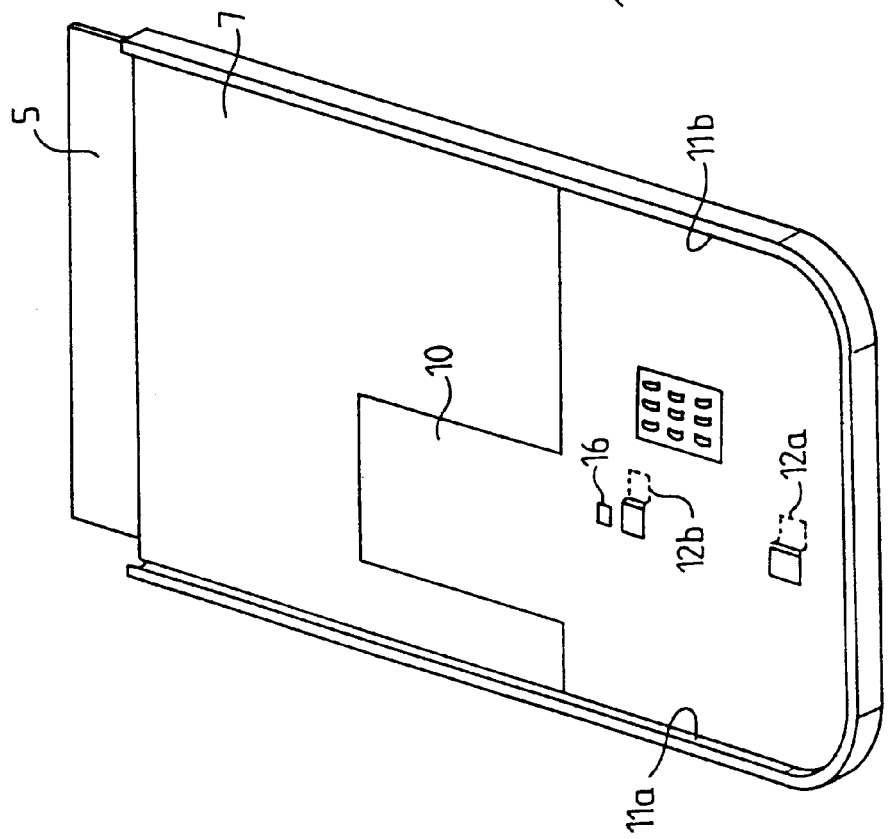
FIG. 3 is a diagrammatic representation of a back-view of a main housing of a telephone according to the invention, with a plate in closed position.

In FIG. 3 is shown the sliding plate 10 in closed position and in FIG. 4 it is represented in open position. The open position makes it possible to insert a small card of the Micro SIM format into the chamber 9. In closed position, the plate 10 thus makes it possible to keep the small card in place and exert a sufficient pressure so that the electrical contact is established between the integrated circuit of the small card and the pins of the connector. In the absence of a small card, the sliding plate is intended to be used as a support to a large card of the ISO SIM format. The integrated circuit of the card will thus be placed relative to an opening 13 provided in the sliding plate at the level of the connector 4 so that the electrical contact is established. The pressure necessary for establishing a proper contact is ensured by the removable module 3 when this removable module is placed on the main housing of the telephone. The springs of the contact pins of the connector 4 are springs with a long stroke for ensuring a contact with the two types of cards which, when they are in place in the telephone, are situated at different distances from the connector 4.

In an embodiment that is particularly simple to handle, return means are provided for automatically returning the sliding plate to its closed position. For this purpose, a chamber 14 is provided in the support 7. This chamber 14 is intended to contain a spring 15 which is fixed, on the one hand, to a point of rest 16 of the sliding plate 10 and, on the other hand, to the support 7 or to the printed circuit card 5. The rest point 16 is cut out from the sliding plate 10 and folded perpendicular to the plate. The spring 15 is a hairpin spring.

I claim:

1. An electronic card reader comprising a connector and adapter means for reading a large or a small card having the same contact configuration, characterized in that said adapter means comprise a plate intended to be moved between an open position notably for inserting a small card into a chamber provided around said connector and a closed position notably for keeping the previously inserted card in place, said plate having an opening provided around said connector which permits to establish a contact between said connector and a large card previously placed on the plate.

2. A card reader as claimed in claim 1, characterized in that said plate comprises means for exerting a contact pressure on a small card inserted into said chamber.

3. A card reader as claimed in claim 1, characterized in that it comprises return means for putting said plate in closed position.

4. A card reader as claimed in claim 1, characterized in that it comprises a frame having guides and in that the plate is a sliding plate sliding in said guides.

5. A card reader as claimed in claim 4, characterized in that the frame notably has a guide called central guide placed along said connector and in that the sliding plate has at least one slide fit in said central guide so as to exert a contact pressure on a small card inserted into said chamber.

6. A card reader as claimed in claim 4, characterized in that said frame has a chamber intended to contain a spring of whose ends one is fixed to a rest point of the sliding plate so as to exert a pressure on the plate when in open position for bringing it back to a closed position.

7. A telephone incorporating an electronic card reader as claimed in claim 1 for reading a large card called ISO SIM card, or a small card called Micro SIM card.

* * * * *